US011355296B2

(12) United States Patent
Lin et al.

(10) Patent No.: US 11,355,296 B2
(45) Date of Patent: Jun. 7, 2022

(54) RETROFIT SWITCH APPARATUS (71) Applicant: XIAMEN ECO LIGHTING CO. LTD., Xiamen (CN)

(72) Inventors: Weihua Lin, Xiamen (CN); Jiaqing Zhuang, Xiamen (CN)

(73) Assignee: XIAMEN ECO LIGHTING CO. LTD., Fujian (CN)

( * ) Notice: Subject to any disclaimer, the term of this patent is extended or adjusted under 35 U.S.C. 154(b) by 0 days.

(21) Appl. No.: 16/854,610

(22) Filed: Apr. 21, 2020

(65) Prior Publication Data

US 2020/0343060 A1    Oct. 29, 2020

Related U.S. Application Data

(60) Provisional application No. 62/837,783, filed on Apr. 24, 2019.

(30) Foreign Application Priority Data

May 13, 2019    (CN) .......................... 201920679747.3

(51) Int. Cl.
*H01H 23/16* (2006.01)
*H05B 47/19* (2020.01)
(Continued)

(52) U.S. Cl.
CPC ............. *H01H 23/16* (2013.01); *F21V 14/06* (2013.01); *F21V 21/30* (2013.01); *F21V 23/003* (2013.01); *F21V 23/04* (2013.01); *F21V 23/0464* (2013.01); *F21V 29/70* (2015.01); *F21V 29/73* (2015.01); *F21V 29/89* (2015.01); *H01H 9/02* (2013.01); *H02G 3/08* (2013.01); *H05B 39/04* (2013.01); *H05B 47/19* (2020.01); *F21Y 2115/10* (2016.08)

(58) Field of Classification Search
CPC .................................. H01H 3/20; H01H 23/16
See application file for complete search history.

(56) References Cited

U.S. PATENT DOCUMENTS 5,397,869 A  *  3/1995  Huen ........................ H01H 3/26
                                                         200/330
8,084,700 B1 * 12/2011  Massaro ................ H01H 23/22
                                                         200/38 R

(Continued)

*Primary Examiner* — K. Wong
(74) *Attorney, Agent, or Firm* — Chun-Ming Shih; Lanway IPR Services (57) ABSTRACT

A retrofit switch apparatus is designed for attaching to a mechanical switch. The mechanical switch has a manual switch for performing an operation of a connected target device. The retrofit switch apparatus includes an assembly box, a wireless module, a switch unit, and a control unit. The assembly box covers the mechanical switch. The wireless module is used for receiving an external command. The switch unit has a driving structure. The driving structure is disposed in the assembly box for engaging with the mechanical switch for moving the mechanical switch to perform the operation according to the external command. The control unit has an operating unit and a trigger unit connected to the operating unit. A portion of the operating unit is exposed outside a surface of the assembly box for a user to operate to directly trigger the mechanical switch.

19 Claims, 8 Drawing Sheets

(51) Int. Cl.
    *H05B 39/04*     (2006.01)
    *F21V 23/04*     (2006.01)
    *H02G 3/08*     (2006.01)
    *H01H 9/02*     (2006.01)
    *F21V 29/70*     (2015.01)
    *F21V 29/89*     (2015.01)
    *F21V 14/06*     (2006.01)
    *F21V 21/30*     (2006.01)
    *F21V 23/00*     (2015.01)
    *F21V 29/73*     (2015.01)
    *F21Y 115/10*     (2016.01)

(56) References Cited

U.S. PATENT DOCUMENTS

| | | | |
|---|---|---|---|
| 8,669,484 B1* | 3/2014 | Benson | H05B 47/115 |
| | | | 200/38 R |
| 8,796,567 B2* | 8/2014 | Mahle | H01H 7/00 |
| | | | 200/33 R |
| 2018/0315562 A1* | 11/2018 | Fenrich | H01H 23/04 |

* cited by examiner

RETROFIT SWITCH APPARATUS

FIELD

The present application is related to a lighting apparatus and more particularly related to an LED lighting apparatus.

BACKGROUND

Electroluminescence, an optical and electrical phenomenon, was discover in 1907. Electroluminescence refers the process when a material emits light when a passage of an electric field or current occurs. LED stands for light-emitting diode. The very first LED was reported being created in 1927 by a Russian inventor. During decades' development, the first practical LED was found in 1961, and was issued patent by the U.S. patent office in 1962. In the second half of 1962, the first commercial LED product emitting low-intensity infrared light was introduced. The first visible-spectrum LED, which limited to red, was then developed in 1962.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

With high light output, LEDs are available across the visible, infrared wavelengths, and ultraviolet lighting fixtures. Recently, there is a high-output white light LED. And this kind of high-output white light LEDs are suitable for room and outdoor area lighting. Having led to new displays and sensors, LEDs are now be used in advertising, traffic signals, medical devices, camera flashes, lighted wallpaper, aviation lighting, horticultural grow lights, and automotive headlamps. Also, they are used in cellphones to show messages.

A Fluorescent lamp refers to a gas-discharge lamps. The invention of fluorescent lamps, which are also called fluorescent tubes, can be traced back to hundreds of years ago. Being invented by Thomas Edison in 1896, fluorescent lamps used calcium tungstate as the substance to fluoresce then. In 1939, they were firstly introduced to the market as commercial products with variety of types.

In a fluorescent lamp tube, there is a mix of mercury vapor, xenon, argon, and neon, or krypton. A fluorescent coating coats on the inner wall of the lamp. The fluorescent coating is made of blends of rare-earth phosphor and metallic salts. Normally, the electrodes of the lamp comprise coiled tungsten. The electrodes are also coated with strontium, calcium oxides and barium. An internal opaque reflector can be found in some fluorescent lamps. Normally, the shape of the light tubes is straight. Sometimes, the light tubes are made circle for special usages. Also, u-shaped tubes are seen to provide light for more compact areas.

Because there is mercury in fluorescent lamps, it is likely that the mercury contaminates the environment after the lamps are broken. Electromagnetic ballasts in fluorescent lamps are capable of producing buzzing mouse. Radio frequency interference is likely to be made by old fluorescent lamps. The operation of fluorescent lamps requires specific temperature, which is best around room temperature. If the lamps are placed in places with too low or high temperature, the efficacy of the lamps decreases.

In real lighting device design, details are critical no matter how small they appear. For example, to fix two components together conveniently usually brings large technical effect in the field of light device particularly when any such design involves a very large number of products to be sold around the world.

On the other hand, when wireless technology keep advancing, various network technologies are developed. More and more devices are connected smartly with wire or wireless networks. Control messages today are conveniently to be transmitted among devices so as device are capable of being operated together to complete a complicated task or help people life more smartly.

Before the new technology replaces every traditional design, it is important and helpful to provide a flexible way to integrate the most advanced IoT (Internet of Things) technology with traditional design, like a wall switch for controlling a connected light device.

SUMMARY

In some embodiments, a retrofit switch apparatus is designed for attaching to a mechanical switch. The mechanical switch has a manual switch for performing an operation of a connected target device. The retrofit switch apparatus includes an assembly box, a wireless module, a switch unit, and a control unit. The assembly box covers the mechanical switch. The wireless module is used for receiving an external command. The switch unit has a driving structure. The driving structure is disposed in the assembly box for engaging with the mechanical switch for moving the mechanical switch to perform the operation according to the external command. The control unit has an operating unit and a trigger unit connected to the operating unit. A portion of the operating unit is exposed outside a surface of the assembly box for a user to operate to directly trigger the mechanical switch.

In some embodiments, the control unit is a button unit and the operation unit has a button structure.

In some embodiments, the assembly box has a top passing hole and a bottom passing hole, a portion of the mechanical switch entering the assembly box via the bottom passing hole, the assembly box has a track, the driving has a moving unit moving along the track and holds the mechanical switch to move according to the external command.

In some embodiments, the moving unit is disposed on an elastic unit to connect to the assembly box.

In some embodiments, the driving structure includes a motor for moving the moving unit according to the external command received from the wireless module.

In some embodiments, the moving unit has a pair of clips for clipping the mechanical switch.

In some embodiments, the control unit is connected to the driving structure, when the driving structure functions normally, the driving structure moves the mechanical switch based on a manual operation on the control unit.

In some embodiments, the control unit has a lock structure, when the lock structure is unlocked, the operation unit pulls the driving structure directly to move the mechanical switch.

In some embodiments, the assembly box has a rotatable opening to opened exposing the mechanical switch as a backup solution.

In some embodiments, the wireless module has a Wi-Fi hot spot for responding to an external device on setting parameters of the wireless module.

In some embodiments, the wireless module automatically searches available hot spots of other retrofit switch apparatuses and automatically communicates with the other retrofit switch apparatuses for co-working with the other retrofit switch apparatuses.

In some embodiments, the communication among the retrofit switch apparatuses is relayed among indirectly connected retrofit switch apparatuses.

In some embodiments, multiple retrofit switch apparatuses receive the same external command and the same external command is translated to different control messages sent to different corresponding target devices based on types of the target devices.

In some embodiments, one among the multiple retrofit switch apparatuses serves a master controlling other retrofit switch apparatuses.

In some embodiments, the driving structure obtains electricity from the mechanical switch.

In some embodiments, the retrofit switch apparatus may also include a battery box with a battery opening on a surface of the assembly box for users to replace a new battery.

In some embodiments, the driving structure enables a lock when the battery has electricity, and disables the lock when the battery is out of electricity, the control unit is kept away from the mechanical switch when the lock is enabled.

In some embodiments, in addition to the driving structure moving the mechanical switch, the wireless module also sends a supplementary command to the target device according to the external command.

In some embodiments, the supplementary command changes operation parameters of the target device.

For example, the target device is a light device, the operation parameters may include color, color temperature, luminance level or other parameter.

In some embodiments, in addition for the driving structure to move the mechanical switch, the driving structure also sends a wireless command to another target device.

DETAILED DESCRIPTION

The present invention is related to an automatic wireless switch that receives a wireless command and activates a motion device to simulate a manual operation on a mechanical switch that is used for controlling a target device.

In some embodiments, the target device is a lighting device mounted in a ceiling. In some other embodiments, the target device is a fan, an air conditioner, a refrigerator, or any other devices controlled by a mechanical switch.

The mechanical switch may contain a button, a lever, a touch panel, or any other manual operable unit for human to touch, move, press, slide or perform any manual operation thereon for changing a status that corresponds to an operation status of the target device.

For example, the mechanical switch may be a switch disposed on a wall for a user to turn on or turn off a lighting device, to tuning a luminance level of a lighting device, speaker volume of a speaker, a temperature setting corresponding to an air conditioner.

Figure 1:
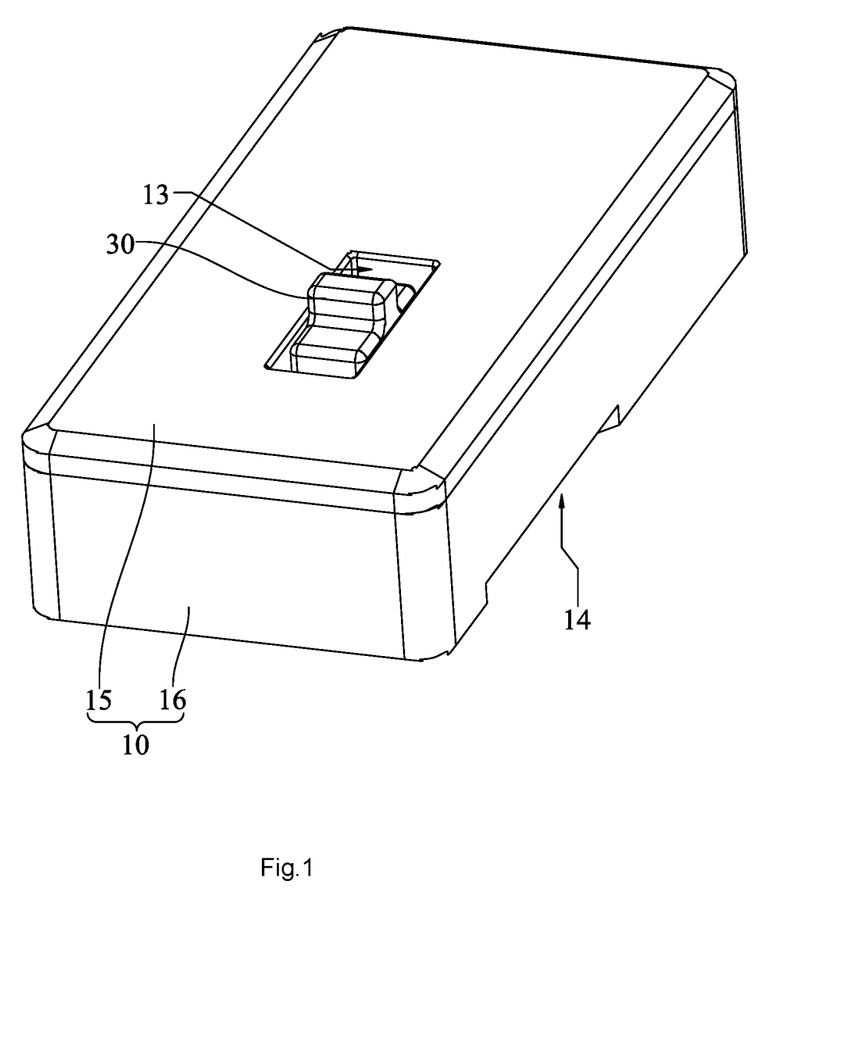
FIG. 1 illustrates a retrofit switch apparatus embodiment.
Figure 2:
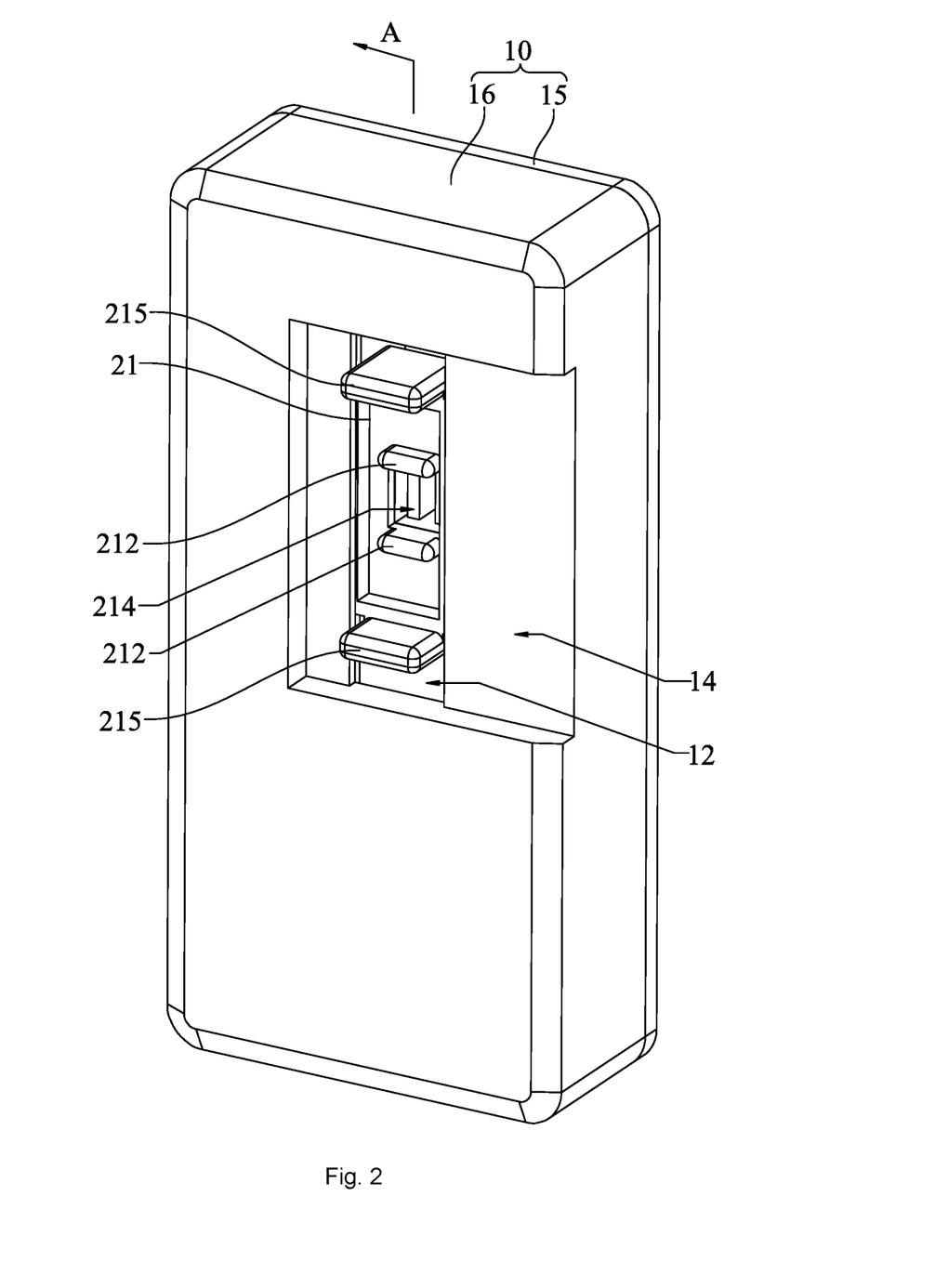
FIG. 2 illustrates the retrofit switch apparatus embodiment.
Figure 3:
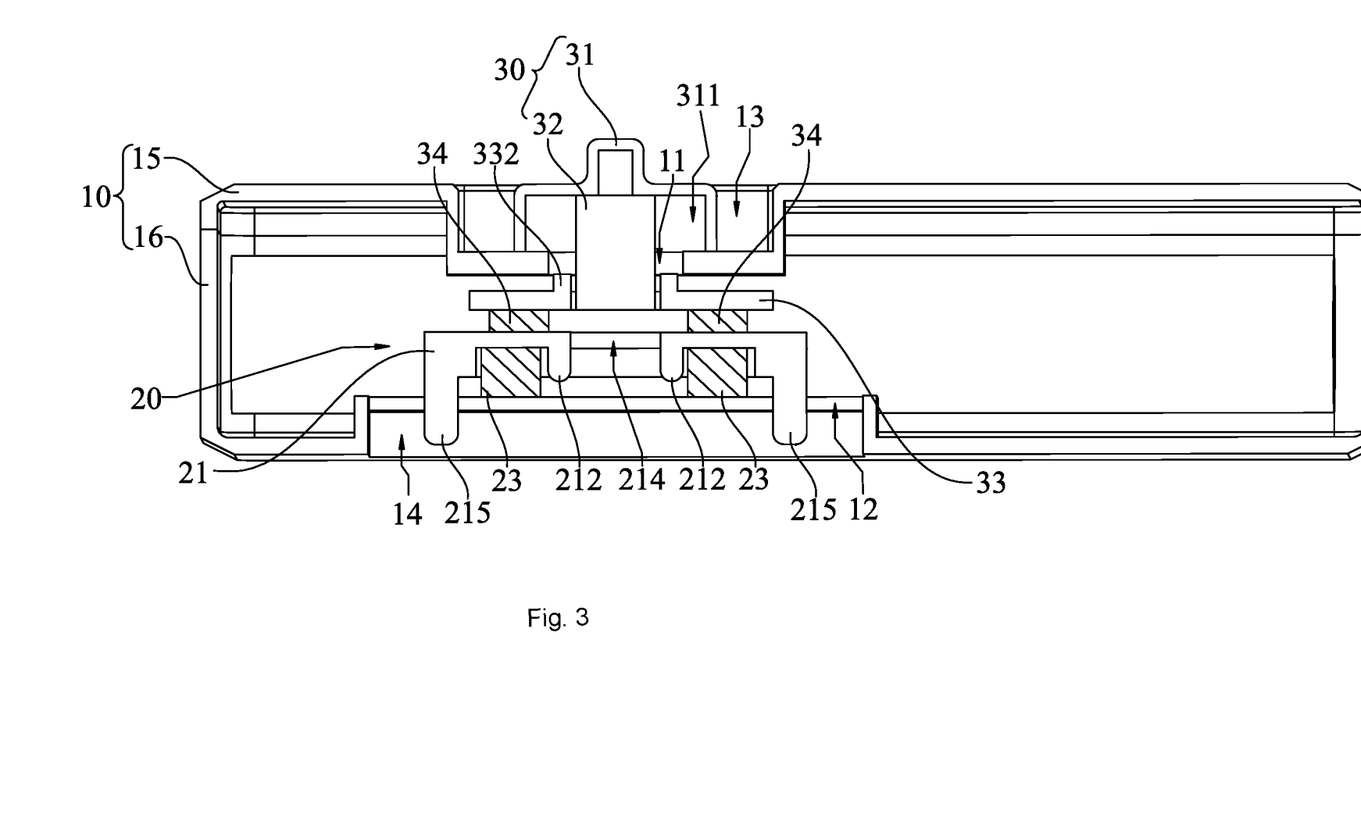
FIG. 3 illustrates a cross-section view of the retrofit switch apparatus embodiment.

As illustrated in FIG. 1 to FIG. 3, an automatic wireless switch 20 is provided. The automatic wireless switch 20 includes an assembly box 10, a switch unit 20 and a button unit 30. The assembly box 10 is used for affixing to a mechanical switch, which may be a pressing button or a lever button, that is connected to a target device and used for controlling an operation of the target device.

In some embodiments, the assembly box 10 may be affixed to the mechanical switch with a sticking tape, which forms a reliable attachment between the automatic wireless switch and the mechanical switch.

In some other embodiments, the assembly box 10 is attached to a mechanical switch with a magnetic unit or a sliding track so as to easily attach to and detach from the mechanical switch.

In this embodiment, there is a top passing hole 11 on a top of the assembly box 10. There is also a bottom passing hole 12 for covering and containing a trigger end of a mechanical switch to move within.

The switch unit 20 has a moving unit 21, a driving structure 22 and one or more first elastic units 23. Each first elastic unit 23 is disposed in the assembly box 10 and connected to a bottom of the assembly box 10.

The moving unit 21 is connected to the first elastic units 23. The driving structure 22 is disposed in the assembly box 10 and for engaging the trigger end of the mechanical switch. With such design, the moving unit 21 is elastically connected to the bottom of the assembly box 10 via the first elastic unit 23. The moving unit 21 is therefore movable in a plane at the bottom of the assembly box 10 based on a support of the first elastic unit 23 and the driving structure 22. Track components may be disposed aside the bottom opening 12 so that the first elastic units 23 are disposed on corresponding track components. The track components are arranged to have a direction in parallel to a driving direction of the driving structure 22, which further improves moving efficiency of the moving unit 21 driven by the driving structure 22 in the plane.

The button unit 30 includes an operating unit 31 on a top of the assembly box 10 and a trigger unit 32 connected to the operating unit 31. Specifically, the top of the assembly box has an installation cavity 13. The operating unit 31 is installed in the installation cavity 13 with certain portion exposed above the top of the assembly box 10.

The trigger unit 32 is inserted into the assembly box 10 via the top opening 11. When there is any problem or failure of the driving structure 22, the trigger unit 32 may be pressed for moving the moving unit 21 while pressing the first elastic unit 23 toward the bottom of the assembly box 10. By performing such operation, the mechanical switch may be indirectly moved for a desired movement to operate a corresponding target device.

In some embodiment, the moving unit 21 is detached from the driving structure 22 when operating unit 31 is pressed and brings the trigger unit 32 to move. In such way, even an electrical driving has a problem, e.g. out of power or other disorder, users may press the operating button 31 to detach the moving unit 21 from the driving structure 22 and meanwhile brings the moving unit 21 to move at the bottom of the assembly box 10 to operate the mechanical switch directly.

Sometimes, even the driving structure 22 works normally, users may still press the operating button 31 to operate the mechanical switch attached at the bottom of the assembly box 10. This is particularly helpful for users who forget where their mobile phone that sends an external command to the driving structure 22 is left.

In some embodiments, the assembly box 10 includes a top cover 15 and housing body 16. The top cover 15 is placed on top of the housing body 16. The installation cavity 13 is disposed at the top cover 15. The bottom opening 12 is disposed at the bottom of the assembly box 16.

Figure 4:
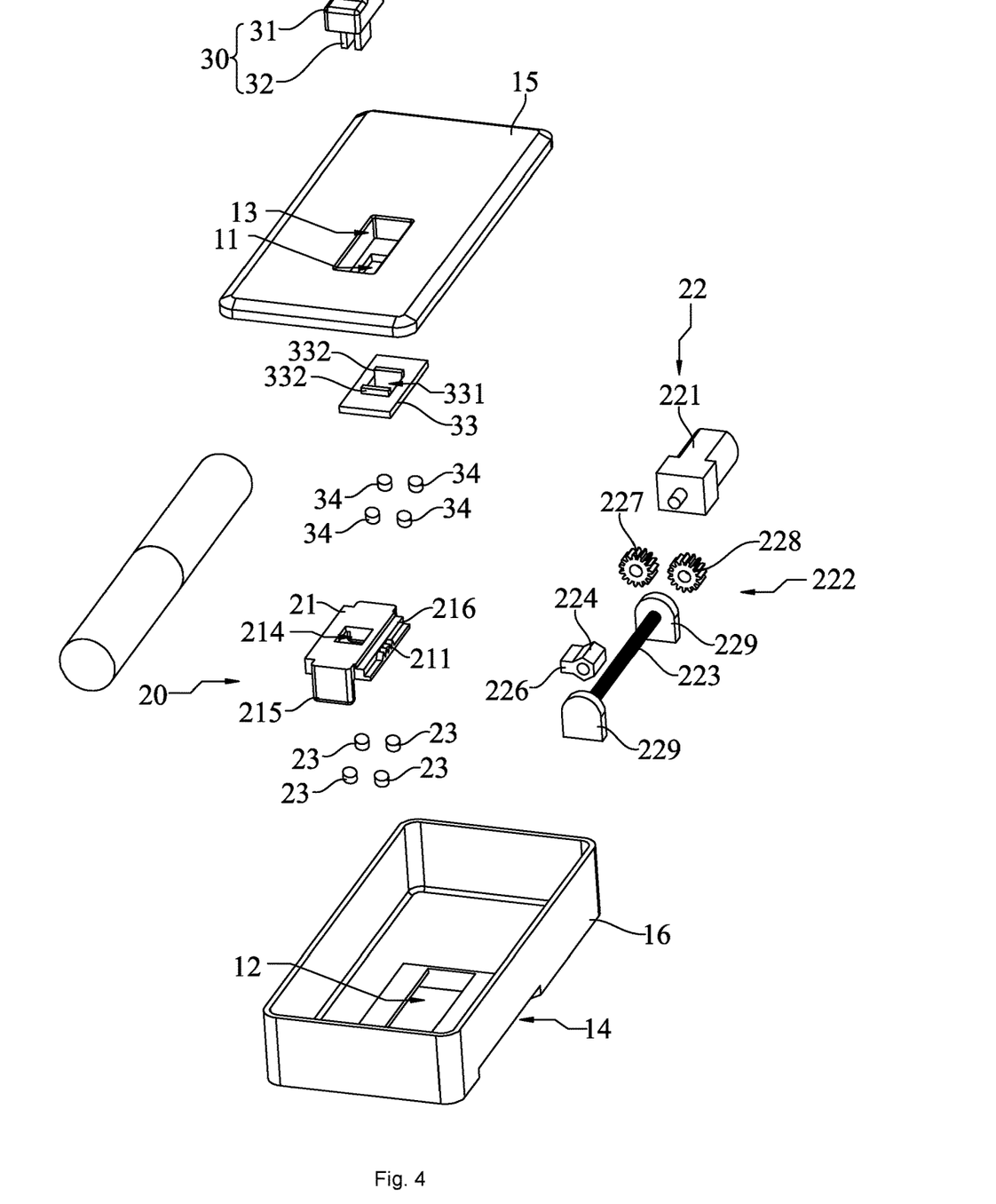
FIG. 4 illustrates an exploded view of the retrofit switch apparatus embodiment.
Figure 5:
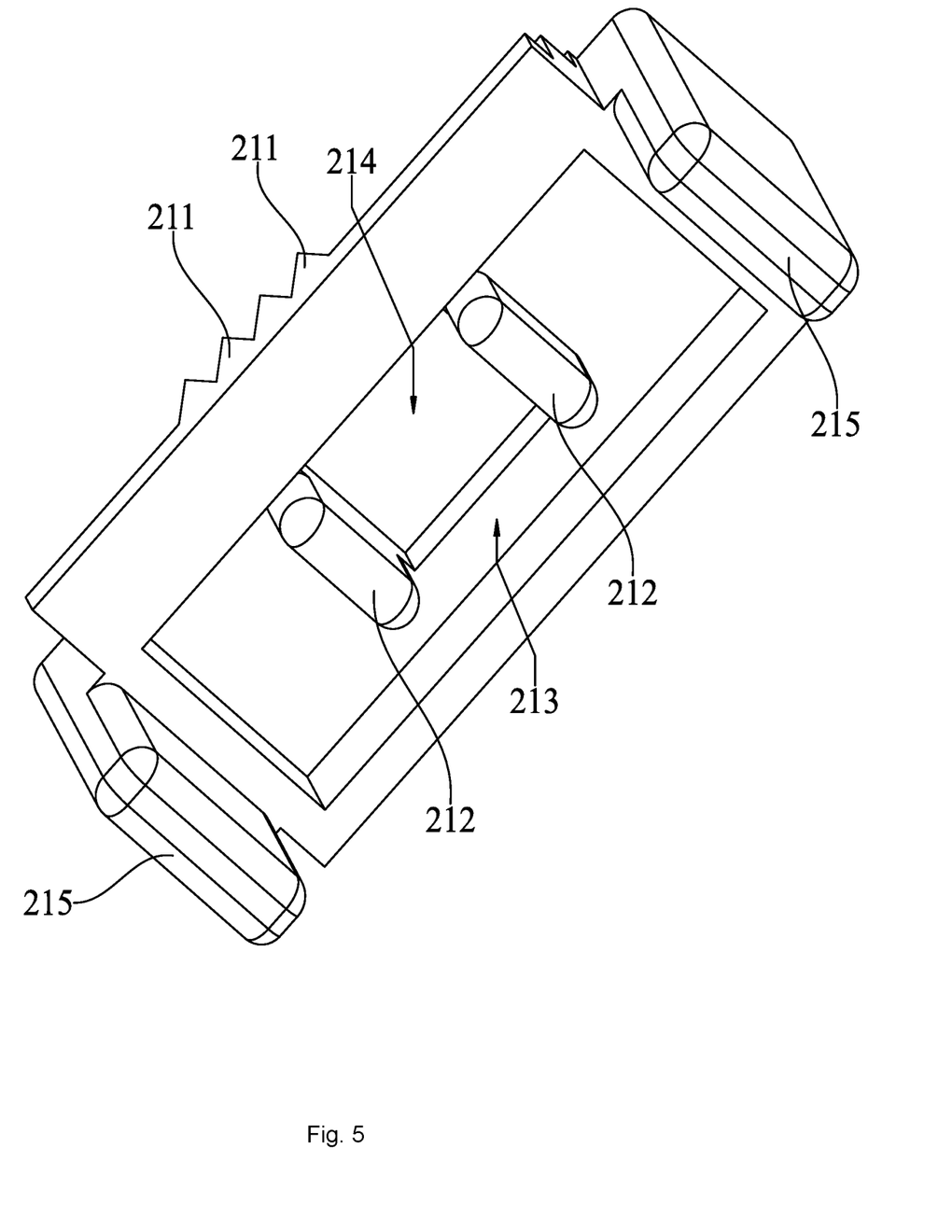
FIG. 5 illustrates a component.

In FIG. 1 to FIG. 3, there are still some parts not clearly explained above, and these parts are explained in more detail accompanied with FIG. 4 and FIG. 5. The same reference numeral in FIG. 4 and FIG. 5 refers to the same component in FIG. 1 to FIG. 3.

FIG. 4 is an exploded diagram showing components in the embodiment of FIG. 1 to FIG. 3. FIG. 5 shows components of a moving unit.

The driving structure 22 includes a driving motor 221, which has a transmission connection to a transmission lever 223 and a driving screw 224 disposed on the transmission lever 223. The driving motor 221 and the transmission lever 223 are installed in the assembly box 10. There is a limiting groove 225 disposed at a bottom end of the driving screw 224. There is a limiting protruding unit 221 disposed at a top end of the moving unit 21. The limiting protruding unit 221 is placed in the limiting groove 225.

When the moving unit 21 is moved toward a direction of the mechanical switch to a predetermined position, the moving unit 21 is detached from the limiting groove 225 so that the moving unit 21 engages the mechanical switch.

Specifically, when the driving structure 22 operates, the driving motor 221 moves the transmission lever to rotate via a transmission unit 222 so as to moving the driving screw 225 to make the moving unit 21 to move axially along an axis of the transmission lever 223.

When the moving unit 21 is moved, the mechanical switch inserted into the bottom opening 21 is brought to move to perform an automatic operation. The driving structure 22 may include a wireless circuit for receiving an external command. The external command is translated by the wireless circuit and converted to a driving signal to operate the driving motor 221 accordingly. In other words, the mechanical switch associated with a target device is now operate via the external command.

When the driving structure 22 is out of order, or users want to operate the mechanical switch directly, without need to detach the assembly box 10 completely. A limiting protruding unit 211 is disposed on top of the moving unit 21. There is a limiting groove 225 disposed on a bottom of the driving screw 224. When the trigger unit 32 presses the moving unit 21, the limiting protruding unit 211 is detached from the limiting groove 225 so that the moving unit 21 is detached from the driving structure 22.

The driving screw 225 has a connection part 226 formed at an end of the moving unit 21. The limiting groove 225 is disposed at a bottom of the connection part 226.

Such design reserve a space for the limiting groove 225 and makes the limiting groove 225 closer to the moving unit 21 for preventing collision between the moving unit 21 and the transmission lever 223.

The moving unit 21 has a ladder structure 216 at an end toward the connection part 226. The limiting protruding unit 221 is disposed on the ladder structure 216. With the ladder structure 216, the distance between the limiting protruding unit 211 and the limiting groove 225 is decreased, which also helps prevent collision between the transmission lever 223 and the moving unit 21.

Figure 6:
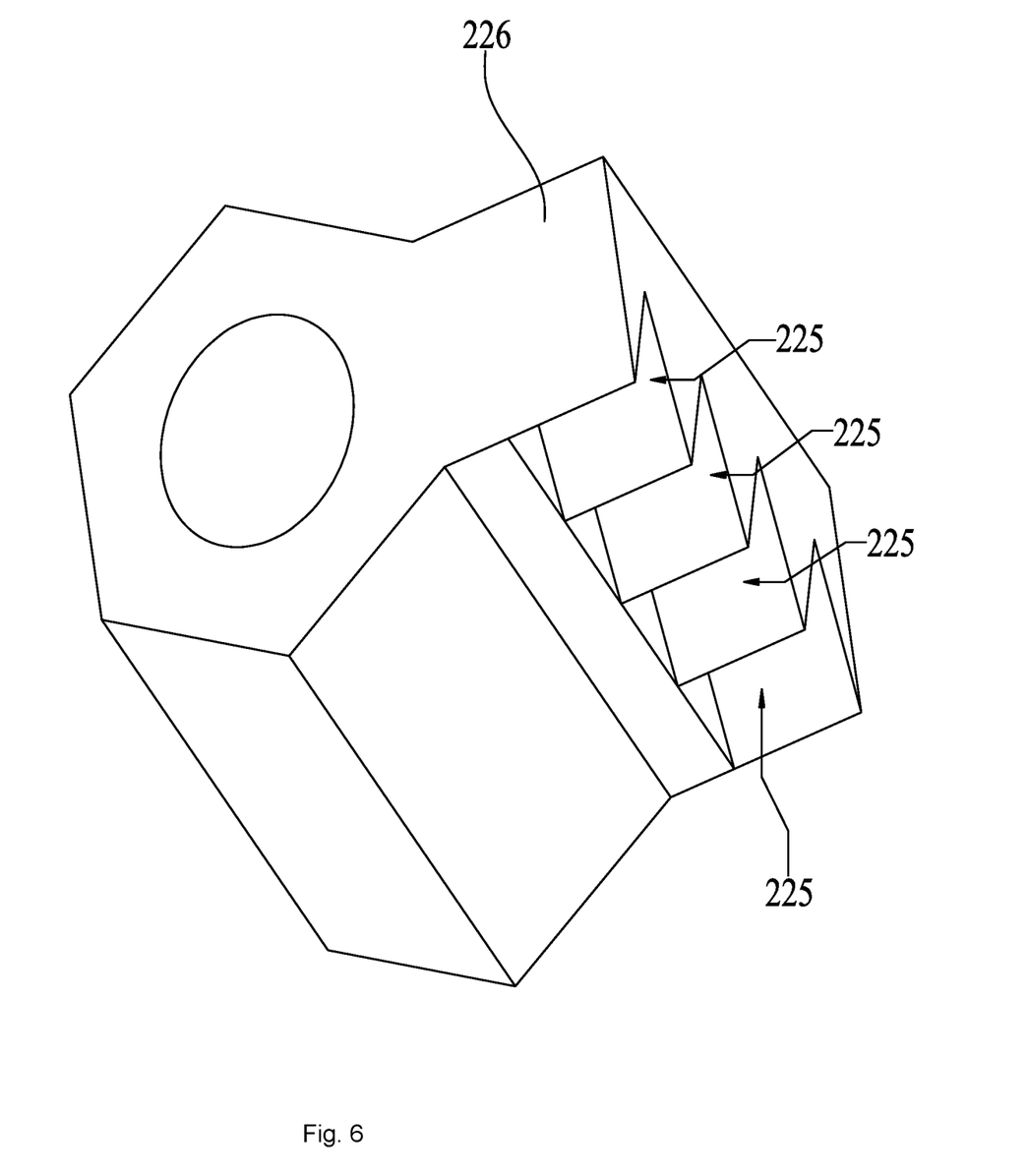
FIG. 6 illustrates another component.

In FIG. 5 and FIG. 6, the limiting groove 225 includes a saw teeth groove with multiple protruding triangular blocks. The protruding triangular blocks with corresponding triangular grooves ensure reliable connection between the moving unit 21 and the driving screw 224.

In addition, the protruding blocks and corresponding triangular grooves are not embedded with a fixed manner, making their detachment more convenient.

Figure 7:
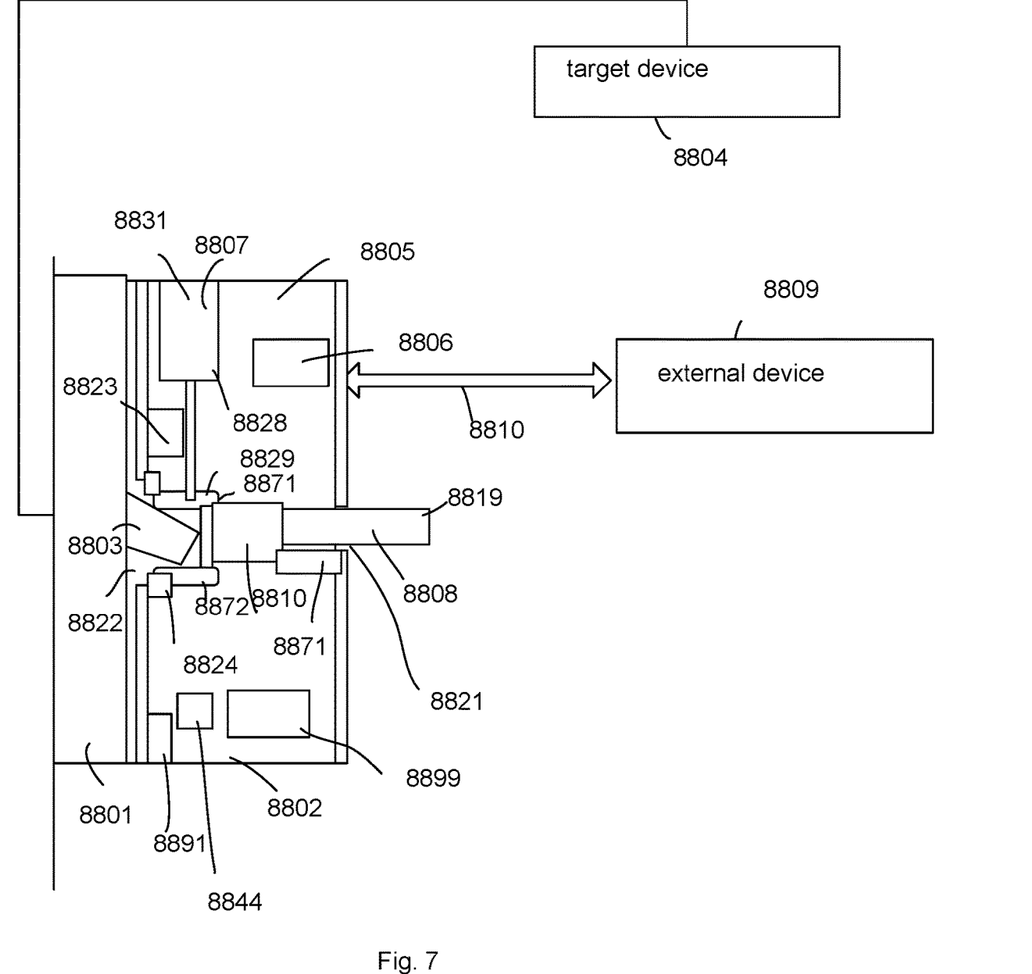
FIG. 7 illustrates a structure view of the embodiment.

In FIG. 7, a retrofit switch apparatus 8802 is designed for attaching to a mechanical switch 8801. The mechanical switch 8801 has a manual switch 8803 for performing an operation of a connected target device 8804. For example, the mechanical switch 8801 is a wall switch with a turn-on and turn-off lever. The mechanical switch 8801 is connected to a target device 8804, like a downlight device installed on a ceiling.

The retrofit switch 8802 apparatus includes an assembly box 8805, a wireless module 8806, a switch unit 8807, and a control unit 8808. The assembly box 8805 covers the mechanical switch 8801. The wireless module 8806 is used for receiving an external command 8810 from an external device 8810.

For example, the external device 8809 is a mobile phone installed with an APP that knows the protocol to communicate with the wireless module 8806. Users use such external device 8809 to control the target device 8804, in addition to a traditional way of operating the mechanical switch 8801 that is directly connected to the target device 8804.

In other words, there are more than one way to control the target device compared with traditional way. In addition, the external device 8809 may not be necessary operated by human. Scheduling operation may be set and stored in a memory circuit like a flash memory, a DRAM, a hard disk or a cloud server. The external command is sent to the wireless module 8806 regularly or under certain conditions.

The switch unit 8807 has a driving structure 8828. The driving structure 8828 is disposed in the assembly box 8805 for engaging with the mechanical switch 8801 for moving the mechanical switch 8801 to perform the operation according to the external command 8810. The control unit 8808 has an operating unit 8819 and a trigger unit 8810 connected to the operating unit 8809. A portion of the operating unit 8819 is exposed outside a surface of the assembly box 8805 for a user to operate to directly trigger the mechanical switch 8801.

For example, the target device is a light device, the operation parameters may include color, color temperature, luminance level or other parameter.

In some embodiments, the control unit 8808 is a button unit and the operation unit 8819 has a button structure.

In some embodiments, the assembly box has a top passing hole 8821 and a bottom passing hole 8822, a portion of the mechanical switch entering the assembly box via the bottom passing hole 8822, the assembly box 8805 has a track 8823, the driving structure 8828 has a moving unit 8829 moving along the track 8823 and holds the mechanical switch 8801 to move according to the external command 8810.

In FIG. 7, the moving unit 8829 is disposed on an elastic unit 8824 to connect to the assembly box.

In FIG. 7, the driving structure 8828 includes a motor 8831 for moving the moving unit 8829 according to the external command 8810 received from the wireless module 8806.

In FIG. 7, the moving unit 8829 has a pair of clips 8871, 8872 for clipping the mechanical switch 8801.

In FIG. 7, the control unit 8808 is connected to the driving structure 8807, when the driving structure 8807 functions normally, the driving structure 8807 moves the mechanical switch 8801 based on a manual operation on the control unit 8808.

In some embodiments, the control unit 8808 has a lock structure 8871, when the lock structure 8871 is unlocked, the operation unit pulls the driving structure 8807 directly to move the mechanical switch 8801.

In some embodiments, the assembly box 8805 has a rotatable opening 8891 to open exposing the mechanical switch 8801 as a backup solution. For example, the rotatable opening 8891 is a rotation shaft to cover a housing of the assembly box 8805.

Figure 8:
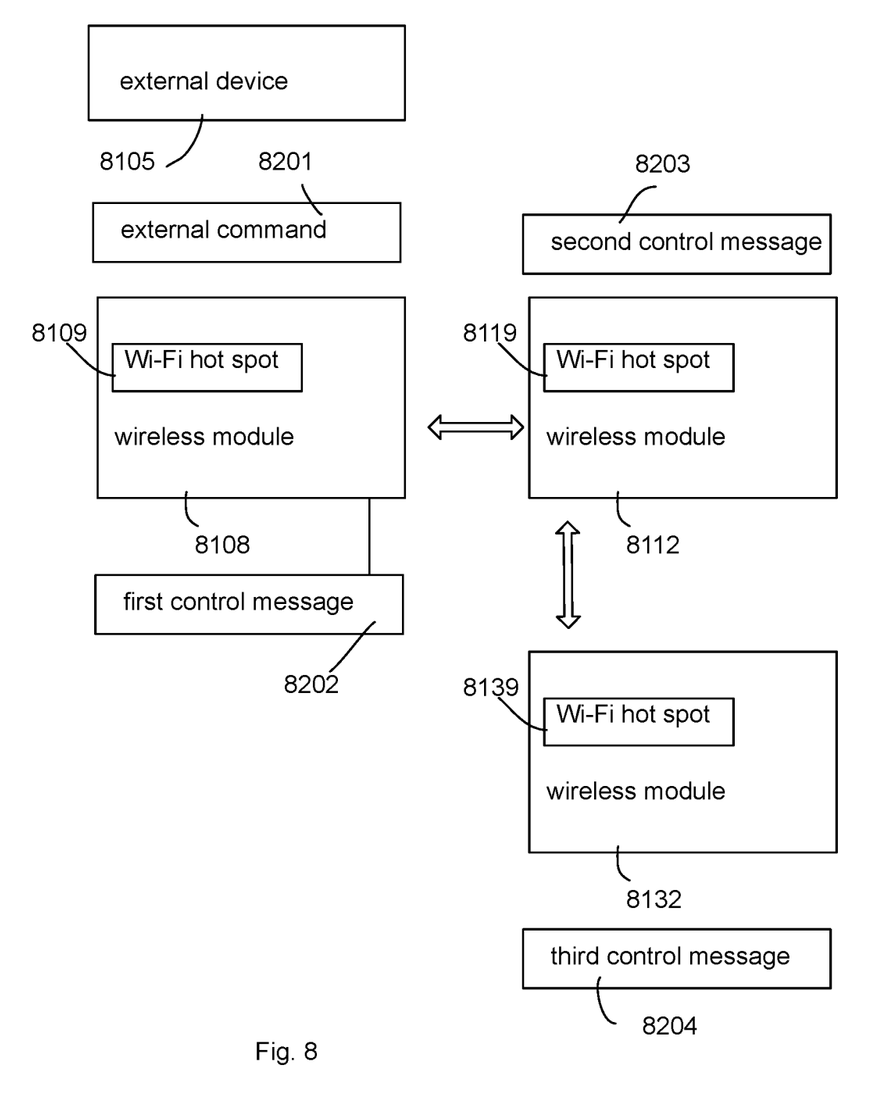
FIG. 8 illustrates an embodiment among multiple retrofit switch apparatuses.

In FIG. 8, the wireless module 8801 has a Wi-Fi hot spot 8802 for responding to an external device 8105 on setting parameters of the wireless module 8801.

In FIG. 8, the wireless module 8108 automatically searches available Wi-Fi hot spots 8119 of other retrofit switch apparatuses and automatically communicates with the other retrofit switch apparatuses for co-working with the other retrofit switch apparatuses.

In some embodiments, the communication among the retrofit switch apparatuses is relayed among indirectly connected retrofit switch apparatuses.

For example, the messages of the wireless module 8108 is sent to the wireless module 8112 of another retrofit switch apparatus. The message is further transmitted from the wireless module 8112 to the wireless module 8132. The wireless module 8132 also has a Wi-Fi hot spot 8139. Therefore, there are various flexible ways to connect the wireless modules 8108, 8112, 8132.

In some embodiments, multiple retrofit switch apparatuses receive the same external command and the same external command is translated to different control messages 8202, 8203, 8204 sent to different corresponding target devices based on types of the target devices.

In some embodiments, one among the multiple retrofit switch apparatuses serves a master controlling other retrofit switch apparatuses.

In some embodiments, the driving structure obtains electricity from the mechanical switch.

In some embodiments, the retrofit switch apparatus may also include a battery box 8899 with a battery opening on a surface of the assembly box 8805 for users to replace a new battery.

In FIG. 7, the driving structure 8807 enables a lock 8844 when the battery 8899 has electricity, and disables the lock 8844 when the battery 8899 is out of electricity, the control unit is kept away from the mechanical switch when the lock is enabled.

In some embodiments, in addition to the driving structure moving the mechanical switch, the wireless module also sends a supplementary command to the target device according to the external command.

In some embodiments, the supplementary command changes operation parameters of the target device.

For example, the target device is a light device, the operation parameters may include color, color temperature, luminance level or other parameter.

In some embodiments, in addition for the driving structure to move the mechanical switch, the driving structure also sends a wireless command to another target device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A retrofit switch apparatus for attaching to a mechanical switch, the mechanical switch having a manual switch for performing an operation of a connected target device, the retrofit switch apparatus comprising:
   an assembly box, covering the mechanical switch;
   a wireless module for receiving an external command;
   a switch unit having a driving structure, wherein the driving structure is disposed in the assembly box for engaging with the mechanical switch for moving the mechanical switch to perform the operation according to the external command; and
   a control unit having an operating unit and a trigger unit connected to the operating unit, a portion of the operating unit is exposed outside a surface of the assembly box for a user to operate to directly trigger the mechanical switch,
   wherein the control unit has a lock structure, when the lock structure is unlocked, the operation unit pulls the driving structure directly to move the mechanical switch.

2. The retrofit switch apparatus of claim 1, wherein the control unit is a button unit and the operation unit has a button structure.

3. The retrofit switch apparatus of claim 1, wherein the assembly box has a top passing hole and a bottom passing hole, a portion of the mechanical switch entering the assembly box via the bottom passing hole, the assembly box has a track, the driving structure has a moving unit moving along the track and holds the mechanical switch to move according to the external command.

4. The retrofit switch apparatus of claim 3, wherein the moving unit is disposed on an elastic unit to connect to the assembly box.

5. The retrofit switch apparatus of claim 3, wherein the driving structure comprises a motor for moving the moving unit according to the external command received from the wireless module.

6. The retrofit switch apparatus of claim 1, wherein the moving unit has a pair of clips for clipping the mechanical switch.

7. The retrofit switch apparatus of claim 1, wherein the control unit is connected to the driving structure, when the driving structure functions normally, the driving structure moves the mechanical switch based on a manual operation on the control unit.

8. The retrofit switch apparatus of claim 7, wherein the assembly box has a rotatable opening to open exposing the mechanical switch as a backup solution.

9. The retrofit switch apparatus of claim 1, wherein the wireless module has a Wi-Fi hot spot for responding to an external device on setting parameters of the wireless module.

10. The retrofit switch apparatus of claim 9, wherein the wireless module automatically searches available hot spots of other retrofit switch apparatuses and automatically communicates with the other retrofit switch apparatuses for co-working with the other retrofit switch apparatuses.

11. The retrofit switch apparatus of claim 9, wherein the communication among the retrofit switch apparatuses is relayed among indirectly connected retrofit switch apparatuses.

12. The retrofit switch apparatus of claim 1, wherein multiple retrofit switch apparatuses receive the same external command and the same external command is translated to different control messages sent to different corresponding target devices based on types of the target devices.

13. The retrofit switch apparatus of claim 12, wherein one among the multiple retrofit switch apparatuses serves a master controlling other retrofit switch apparatuses.

14. The retrofit switch apparatus of claim 1, wherein the driving structure obtains electricity from the mechanical switch.

15. The retrofit switch apparatus of claim 1, further comprising a battery box with a battery opening on a surface of the assembly box for users to replace a new battery.

16. The retrofit switch apparatus of claim 15, wherein the driving structure enables a lock when the battery has electricity, and disables the lock when the battery is out of electricity, the control unit is kept away from the mechanical switch when the lock is enabled.

17. The retrofit switch apparatus of claim 1, wherein in addition to the driving structure moving the mechanical switch, the wireless module also sends a supplementary command to the target device according to the external command.

18. The retrofit switch apparatus of claim 17, wherein the supplementary command changes operation parameters of the target device.

19. The retrofit switch apparatus of claim 1, wherein in addition for the driving structure to move the mechanical switch, the driving structure also sends a wireless command to another target device.

* * * * *